No. 782,914. PATENTED FEB. 21, 1905.
W. LANGMUIR.
VEHICLE TIRE.
APPLICATION FILED APR. 14, 1902. RENEWED JULY 26, 1904.
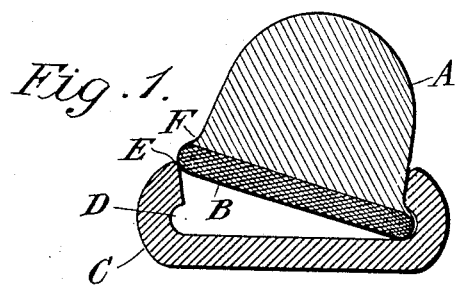
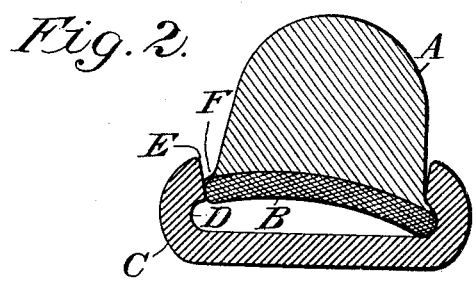
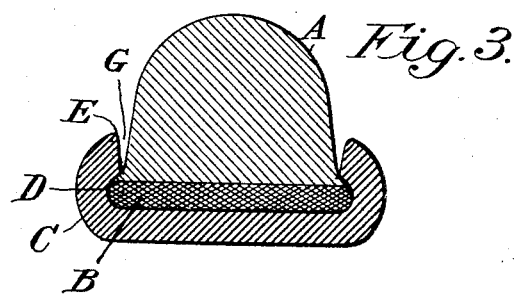
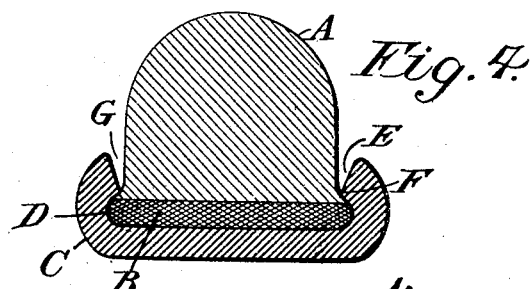

No. 782,914. Patented February 21, 1905.

UNITED STATES PATENT OFFICE.

WOODBURN LANGMUIR, OF NEW YORK, N. Y.

VEHICLE-TIRE.

SPECIFICATION forming part of Letters Patent No. 782,914, dated February 21, 1905.

Application filed April 14, 1902. Renewed July 26, 1904. Serial No. 218,183.

*To all whom it may concern:*

Be it known that I, WOODBURN LANGMUIR, a subject of the King of Great Britain, and a resident of New York, in the county of New York and State of New York, have invented certain new and useful Improvements in Vehicle-Tires, of which the following is a specification.

My invention relates to rubber tires for vehicles, particularly to the kind designated as "wireless" tires.

The object of my invention is to do away with the defects inherent in tires that are fastened on by wires and to provide a cheap and efficient tire that shall be held in place without wires and be easily and quickly put on and taken off the wheel. To accomplish this, I so shape my flange and the bottom of my tire that they conform to each other, and so proportion the flange and tire that the latter can without injurious strain be slipped into and out of the retaining part of the flange.

In the drawings hereto attached, Figure 1 is a sectional view of the tire and flange, showing the position of the tire before pressure is applied to force it into the flange. Fig. 2 shows the shape assumed by the lower part of the tire while being forced into the flange. Fig. 3 shows the tire seated in the flange; and Fig. 4, a view similar to Fig. 3, but showing a tire having straight sides.

Referring to the drawings, A is the thread. B is the stiffened base. C is the flange; D, a curved hollow formed by bending of the flange for retaining the tire in place. E is the outwardly-inclined edge of the flange. F is a portion of the rubber of the tire carried out over the top edge of the stiffened base. G is a wedge-shaped space left between the tire and the side of the flange.

I form my flange in the shape shown both for the purpose of holding the tire and also for giving strength to that part of the flange that is subject to greatest wear and strain. The tire is of course of the class made in lengths, not a circular one, and the ends are cemented together, as in butt-jointed tires. The stiffened base may be of any suitable material, such as ply fabric or steel or any substance that is capable of elastic buckling laterally. Its thickness may be anything within the limits of being sufficiently elastic. The outer edges of the base are shaped to conform to and fit into the holding-channels D. The portion F of the rubber that is brought over the top of the stiffened base B serves to keep the moisture, &c., away from the top of the base and also by being elastic helps to more firmly lock the tire in the channel D. For the purpose of fitting the base into the channel without injurious strain on the tire I make the inner edges E of the flange C tapering outwardly. This tapering is so proportioned that when the one edge of the base rests in the opposite recess the stiffened base will be about in the position shown in Fig. 1, and the tapering sides of the flange will allow the tire to slide down into the position shown in Figs. 3 and 4, passing meanwhile through the position shown in Fig. 2. With straight or inwardly-inclined sides E the process of forcing the tire into place would be impracticable.

The operation of applying the tire is plainly understood from the drawings. The tire is placed in the flange, one side of the stiffened base resting in one of the recesses D, while the corresponding side of the elastic portion rests against the outwardly-inclined face of the flange. The distance from the side of the recess in which the stiffened base rests to the top of the oppositely-located inclined flange is such as to allow the stiffened base to slightly enter the mouth of the channel; but this distance must be so proportioned that there will be no strain sufficient to endanger the union between the elastic portion and the base while the tire is being pushed downward into its position within the recesses of the flange. This inserting of the tire can be accomplished by means of a spade or a wheel or any suitable mechanical tool, and on account of the proportioning of the parts of the tire to the flanges and recesses the tire when forced into position fills the recesses closely and is securely held in place.

I have tested this wireless tire for many months and find that it is more firmly seated in its channel than if held by wires. When necessary to repair, only the injured portion of the tire can be removed from its seat and replaced.

The spaces G between the flanges and the tire are important and beneficial in that they provide for the displacement of the rubber under load, thus preventing disintegration of the rubber from the base and also preventing the sides of the tire being cut to pieces by displacement under load over the edges of the flanges.

Having thus fully illustrated and described my invention, what I claim is—

1. In a vehicle-tire, the combination of an elastic portion having a stiffened base, a rim having inwardly-formed recesses and outwardly-inclined sides, the rim and tire being so proportioned relatively to each other that the tire is adapted to be inserted in the rim by flexing the stiffened base portion past the shoulder of the undercut portion of the rim, substantially as set forth.

2. The combination with a rim having upwardly-extending side flanges, with recesses along their inner surfaces, and having its bottom wall straight or continuous in cross-section, and a non-inflatable elastic tire having a stiffened base extending continuously entirely across the same, the rim and tire being so proportioned relatively to each other that the tire is adapted to be inserted in the rim by flexing the stiffened base past the contracted portion of said flanges above said recesses, and being so proportioned that said tire, when in place, lies in its normally unflexed condition, supported at all points throughout its width by the bottom wall of said rim, and is retained in place by the engagement of said flanges with said tire adjacent to said base.

Signed at New York, in the county of New York and State of New York, this 12th day of April, A. D. 1902.

WOODBURN LANGMUIR.

Witnesses:
 A. H. FRANCFORT,
 A. STETSON.